Patented Oct. 28, 1952

2,615,826

UNITED STATES PATENT OFFICE 2,615,826

ARTICLE COMPRISING CORD BONDED TO RUBBER BY A VINYLPYRIDINE ADHESIVE

Gerald D. Mallory, Akron, and Theodore R. Ten Broeck, Cuyahoga Falls, Ohio, assignors to Wingfoot Corporation, Akron, Ohio, a corporation of Delaware No Drawing. Application August 2, 1946, Serial No. 687,940

6 Claims. (Cl. 154—46)

This invention relates to an improved adhesive for bonding reinforcing cords to rubber, to a reinforcing cord treated with the adhesive and to a rubber article having a cord bonded therein by means of the adhesive.

In the manufacture of rubber articles, including pneumatic tires and mechanical rubber goods, the life of these articles depends to a great extent upon the reinforcement employed and the ability to properly join the reinforcing material to the rubber. Reinforcing material includes cord and fabric made therefrom and may be a natural textile material as, for example cotton, or a cellulosic material as, for example rayon, or a polyamide reaction product as, for example nylon, or cable made out of fine steel wire. Each material presents a different adhesive problem. Considerable experience has been gained in bonding cotton cord to natural rubber. Less is known about the proper bonding of rayon and nylon to both natural and synthetic rubber. Natural rubber latex has long been used in solving this problem of cord-to-rubber adhesion, but with higher speeds required for tires and the demand for longer life, improvements had to be made and various compounding ingredients were added to the natural rubber latex, including such proteinaceous materials as casein and such resins as phenol-formaldehyde and resorcinol formaldehyde, but in all of these formulations no adhesive had yet been produced which was commercially reliable in all respects. In commercial operation the casein-base adhesives are undermined by water and some solvents, and do not have the desired adhesion at high temperatures. Also, these adhesives have a tendency to spoil on slight ageing, thereby interfering with maximum adhesion. At the present time adhesives have been developed in which the casein has been replaced by other resinous material, but even here adhesives of this type have a tendency to coagulate while being used in production and to set up after they have been applied to the reinforcing material and before the reinforcing material has been calendered onto the rubber which is to be reinforced.

It has now been discovered that these problems may be solved by using an adhesive containing the copolymer of a vinylpyridine monomer and a 1,3-diene monomer. It has also been discovered that an exceptionally successful adhesive may be prepared by mixing the vinylpyridine-diene copolymer with a butalastic as, for example a butadiene rubber, which adhesive shows exceptional bonding power when used in the manufacture of synthetic rubber articles.

A further improved adhesive is produced when a resin or a proteinaceous material such as casein is added to the vinylpyridine-diene copolymer and butalastic.

The vinylpyridine-diene copolymer component of this adhesive is the product resulting from the reaction of a conjugated diene and a vinylpyridine in emulsion, using heat and a catalyst. The preferred diene monomer is 1,3-butadiene and the preferred vinylpyridine monomer is 2-vinylpyridine. However, any 1,3-diene monomer may be used, including isoprene, 2,3-dimethyl-1,3-butadiene, 2-ethyl-1,3-butadiene, 1,3-dimethyl-1,3-butadiene, 1,3-pentadiene, 2,4-pentadiene, 3-methyl-2,4-pentadiene, 3,4-dimethyl-2,4-pentadiene, the straight chain, branched chain and cyclohexyl dienes, heptadienes and homologs, analogs or hydrocarbon substituted products.

Other vinylpyridines include 4-vinylpyridine and various aliphatic vinylpyridines, particularly the alkyl vinylpyridines such as 2 - methyl-6-vinylpyridine, 2 - vinyl - 5 - methylpyridine, 2-ethyl-5-vinylpyridine. These monomers may be copolymerized by any of the conventional methods well-known in the art, such as in bulk without solvents or diluents, in the presence of an inert solvent, or in emulsion. The proportions of the monomers initially present in the emulsion to be polymerized may be varied over a wide range. The ratio of diene to vinylpyridine may range from about 95/5 to about 20/80, and it is desired to use a ratio in which the diene is present in a predominant amount. A preferred ratio range of diene to vinylpyridine is between about 80/20 and about 40/60. A standard formulation for the preparation of a copolymer of 1,3-butadiene and 2-vinylpyridine comprises the use of 180 parts of water per 100 parts of monomer, 5% of an emulsifier as, for example, sodium stearate, and 0.3% of a catalyst as, for example potassium persulfate. In addition to this standard formulation, antioxidants and modifiers may be added.

In order to emphasize the advance made over known adhesives, comparative data are disclosed below and these data are based upon identical test conditions. All test specimens were prepared in the same way. For example, natural rubber test specimens were cured at 200 pounds per sq. in. pressure for 10 minutes at 300° F., and the synthetic rubber test specimens were similarly cured but for 20 minutes. All adhesion values are given in pounds tensile, as developed in pulling a ⅜" cord out of a block of rubber ⅜" wide, .1" thick and about 1" long. Further description of this test may be found in Bulletin AIC–99 issued October 1945 by the Southern Regional Research Laboratory of the U. S. Department of Agriculture.

In order to further emphasize the exceptional results obtained with the adhesive of this invention, test data is given with respect to both natural rubber and synthetic rubber reinforced with cotton cord, rayon cord and nylon cord. In the case of cotton cord, the specifications call for about a 1 1/16 inch staple cotton spun as a 16's yarn and twisted 4/3 construction with a twist of 14 Z per inch in the single, 16.5 Z per inch in the ply and 10.6 S per inch in the cable. The rayon cord used in the examples is known as 1100 denier twisted 2 ply with a single twist of 13 Z per inch and a ply twist of 13 S per inch. The nylon cord used in the example is known as 210 denier 4/2 construction with a single twist of 1 turn either Z or S, a ply twist of 12 Z turns per inch and a cable twist of 10.5 S per inch.

Very poor adhesion is obtained between the nylon and rayon type of reinforcing cord and natural and synthetic rubber without treatment. By natural rubber is meant any rubber of a botanical source, including *Hevea brasiliensis*, etc. By synthetic rubber is meant any polymer of a 1,3-diene or copolymer with other polymerizable compounds, including the copolymers of 1,3-butadiene and styrene, acrylonitrile, etc. All data is given in terms of the results obtained in the production of bonds with the *Hevea brasiliensis* natural rubber and with the 1,3-butadiene-styrene rubber commercially known as GR–S, and in which 75% of 1,3-butadiene is copolymerized with 25% of styrene in emulsion.

Under ideal conditions, untreated rayon and nylon cord may be bonded to both natural and synthetic rubber by an adhesive force of not more than 7 to 9 pounds tensile. Cotton cord develops a value of between 12 and about 17. When nylon is treated with a rubber latex, some improvement is noted. For example, treatment with an artificial dispersion of rubber, which may be, for example, a whole tire reclaim dispersed in water, increases the value to 12 for both natural and synthetic rubber, and increases the value for rayon to about 15 for natural rubber and 17 for synthetic rubber.

Treatment of nylon, rayon and cotton with uncompounded GR–S latex has no beneficial effect with either natural or synthetic rubber. However, treatment of nylon with the 1,3-butadiene-2-vinyl-pyridine copolymer, hereinafter referred to as B/VP, increases the bond by 37% on natural rubber and on synthetic rubber, hereinafter referred to as GR–S, increases the bond 100%. For rayon on natural rubber, an increase of 79% is observed, and an increase of 175% is obtained on GR–S. A substantial increase is obtained for cotton on GR–S. In order to improve the bonding of each reinforcing material to natural rubber, it has been found that results comparable to those obtained on synthetic rubber may be produced when the B/VP latex is blended or mixed in equal proportions with GR–S latex. A preferred adhesive has a solids latex content ranging from 10% to 26% and may be produced by using a 1:1 ratio of GR–S latex to B/VP latex, depending on the mechanical treatment of the cord used. A mixture of 8% GR–S latex and 8% B/VP latex produced bonds on natural rubber with nylon, rayon and cotton ranging from about 55% for nylon to about 33% for rayon to about 18% for cotton, better than the bonds produced using the B/VP latex alone. Similar results were obtained on synthetic rubber using the same adhesive.

The ratio percent of B/VP latex to GR–S latex in the adhesive may range from about 14/2 to about 2/14, to produce an adhesive having a total solids content for the latices of 16%. However, it is preferred to use a ratio of 9/7, since this ratio gives an average bond for nylon, rayon and cotton on both natural and synthetic rubber, which is slightly better than the other ratios. However, any ratio within the range specified may be used.

A further improvement in this adhesive containing the blend of latices just described may be obtained by adding a resin or a proteinaceous material such as casein. The following data sets forth the results when employing casein or a stage "A" phenolformaldehyde resin or a resorcinol-formaldehyde resin.

A sodium phenylate caseinate solution was made up containing ½% caustic (sodium hydroxide), 1% phenol and 12% casein. The caseinate was added in varying amounts and the latex solids or rubber hydrocarbon solids were maintained at 16%. The addition of 0.5% casein to the 9/7 B/VP–GR–S adhesive produced a bond for nylon on natural rubber ranging from 49 to 86%, for rayon on natural rubber ranging from 11 to 18% and for cotton on natural rubber up to about 7% higher in each case than the bond produced using the same adhesive without the resin component. Comparable improvement is observed when using additional 0.5% increments of casein up to a total of 3.0%. Similar results are also observed on synthetic rubber. Although the addition of casein to the latex blend formulation produces desirable increases in adhesion, the presence of casein does cause certain difficulties when used in production and therefore it is desirable to replace the casein component and at the same time retain the desirable bond strength.

Desirable results are produced when a stage "A" phenolformaldehyde resin is used. The resin is a water-soluble thermosetting phenolformaldehyde condensation product which is prepared by reacting a phenol with a molecular excess of an aldehyde, for example formaldehyde, in the presence of an alkaline catalyst until a water-soluble product is produced. More particularly, the resin may be prepared by reacting 50 parts of phenol with 90 parts of 37% formaldehyde in the presence of 1.5 parts of sodium hydroxide at 90° C. for 50 minutes in a water bath. The stage "A" phenolformaldehyde resin may be added in 0.5% increments between about 0.5% and about 3%. Adhesion values comparable to those obtained when using casein were obtained when using the stage "A" phenolformaldehyde resin in place of the casein in the above-noted formulation. It was observed, however, that consistently better results were obtained with the stage "A" phenol-formaldehyde resin formulation than in the casein formulation.

Thus, the use of the stage "A" phenol-formaldehyde resin has a stabilizing influence on the adhesive produced and insures reproduction of results.

Another formaldehyde resin that may be used to great advantage in the adhesive formulation is the resin produced by reacting resorcinol with formaldehyde. One half to 3 mols of CH₂O may be used per mol of resorcinol and the reaction may be conducted in water at room temperature. A similar series of tests involving rayon, nylon and cotton on both natural and synthetic rubber indicates that this formulation produces exceptionally desirable adhesions regardless of the type of cord and rubber being bonded together. Values as high as 25.2 pounds were obtained for cotton on natural rubber, 25.6 pounds were obtained for nylon on natural rubber, at which point the cord broke, and values as high as 20.6 pounds were obtained for rayon on natural rubber. Similar values were also obtained for these different cords on synthetic rubber. The same desirable results were noticed when employing the resorcinol-formaldehyde resin in amounts between about 0.5% to about 4%. It is preferred to use about 2.0%, based upon the total adhesive. In addition to the remarkable adhesion produced between nylon cord and rubber, it has also been observed that the shrinkage of nylon is substantially eliminated when treated with the above adhesive containing the resorcinol-formaldehyde resin.

The resin component of the adhesive may be a mixture of resins or a single resin. However, tests show that any combination of two of the three resins is not as good as any one of the resins.

Each of the tests conducted in evaluating the adhesive strength of the various formulations was performed by hand dipping the cord in the latex, followed by 7½ minutes of drying at 250° F. and then embedding the treated cord in the standard rubber block and vulcanizing as described above to produce the test specimen.

The commercial application of the adhesion comprises running the cord through a machine in which the cord is dipped in the adhesive contained in a dip tank and stripping off the excess adhesive by means of gravity flow, squeeze rolls or air jets, drying in an oven or in a chamber of fast moving air at a rate to prevent blistering of the adhesive away from the fibers, followed by a higher stage drying and baking process.

Each of the foregoing tests involving the use of a formaldehyde resin was based upon a formulation containing 9% B/VP latex and 7% GR-S latex plus 2% of a resin prepared by reacting over twice the theoretical requirement of formaldehyde or by reacting 2 mols of formaldehyde with 1 mol of phenol or resorcinol. In view of the fact that excess formaldehyde is objectionable from the standpoint of fumes at the dip machine in production, it is preferred to use the minimum amount of formaldehyde necessary to bring about desirable results. Thus, equal molecular amounts of formaldehyde to 25% excess formaldehyde may be used. However, where a plasticizing action is desired as is desirable where the treated cord is to be stored for some time, then an excess of resorcinol is to be used.

An important characteristic that a cord adhesive must have, is an ability to maintain its adhesive strength after it has been aged by heat and tested either at room or high temperature. The present adhesive involving the use of the B/VP component together with the GR-S latex and a resin, has good heat-ageing characteristics. However, these characteristics are improved when the resin component is made without the use of an alkaline substance or when only using a minimum amount.

Maximum results, using the adhesive of this invention, are obtained when the B/VP latex is used in an amount of about 13%, the GR-S latex in an amount of about 10% and the resin in amount of about 3%, the resin being prepared using 25% excess formaldehyde and passing the cord through the adhesive at a rate to permit a solids pick-up of about 10 to 21%. However, in view of the exceptional results obtained when using the B/VP component, either alone or with other latices and resins, these conditions are not critical but are merely those referred. The B/VP component may be present in an amount between about 5 to about 15%; the GR-S component may be present in amount between about 5 to about 10%; and the resin component may be present in an amount between about 1% and about 5%, each based upon the total components present.

The preparation of the adhesive is carried out by mixing the components together and completing the reaction between the various reactable components. Such a mixture comprises the formaldehyde component of the resin, the phenol or resorcinol component of the resin, and the latices. It has been observed, however, that when using a phenol-formaldehyde type resin, best results are obtained when the phenol and formaldehyde are reacted to stage "A" before mixing with the latices. Good results are obtained, however, with the resorcinol-formaldehyde resin using either method.

The following tables emphasize the exceptional and unexpected results obtained using an adhesive containing a B/VP component.

Table I shows the adhesion developed between untreated cord and natural and synthetic rubber.

TABLE I

| Rubber | Adhesion | | |
|---|---|---|---|
| | Cotton | Rayon | Nylon |
| Natural | 17.6 | 8.4 | 8.8 |
| GR-S | 12.0 | 7.0 | 7.0 |

Table II shows results obtained when treating the cord with synthetic rubber latices and reclaim natural rubber latex.

TABLE II

| Latex | Rubber | Adhesion | | |
|---|---|---|---|---|
| | | Cotton | Rayon | Nylon |
| Reclaimed rubber | Natural | 15.6 | 15.2 | 12.0 |
| Do | GR-S | 17.8 | 17.4 | 12.0 |
| GR-S | Natural | 17.4 | 8.6 | 8.0 |
| Do | GR-S | 13.8 | 6.2 | 5.8 |
| B/VP | Natural | 17.0 | 15.0 | 11.6 |
| Do | GR-S | 21.6 | 19.2 | 14.0 |

Table III shows results produced using blends of latices.

TABLE III

| Percent Latex | | | Rubber | Adhesion | | |
|---|---|---|---|---|---|---|
| Disp. | GR-S | B/VP | | Cotton | Rayon | Nylon |
| 8 | 8 | 0 | Natural | 18.2 | 14.6 | 9.6 |
| 8 | 8 | 0 | GR-S | 16.6 | 8.2 | 11.2 |
| 8 | 0 | 8 | Natural | 14.2 | 10.4 | 12.2 |
| 8 | 0 | 8 | GR-S | 21.8 | 19.0 | 16.0 |
| 0 | 8 | 8 | Natural | 20.4 | 20.2 | 17.4 |
| 0 | 8 | 8 | GR-S | 20.8 | 18.0 | 12.6 |
| 4.8 | 4.8 | 4.8 | Natural | 19.8 | 19.0 | 16.8 |
| 4.8 | 4.8 | 4.8 | GR-S | 19.0 | 17.8 | 11.2 |

Table IV shows the adhesion of cord to natural and synthetic rubber using 2% phenol-formaldehyde resin.

TABLE IV

*9/7 latex with phenol-formaldehyde adhesion of cord to natural and synthetic rubber*

| RHC, Percent | Rubber | Adhesion | | |
|---|---|---|---|---|
| | | Cotton | Rayon | Nylon |
| 9/7 | Natural | 23.2 | [1] 17.3 | 18.4 |
| 9/7 | GR-S | [1] 23.0 | [1] 20.0 | 20.2 |

[1] Cord broke. RHC symbolizes rubber hydrocarbon; 9/7 symbolizes 9% butadiene-vinyl pyridine rubbery copolymer and 7% butadiene-styrene rubbery copolymer plus 2% of a phenol formaldehyde resin.

Table V shows the adhesion of cord to natural and synthetic rubber using 2% resorcinol-formaldehyde resin.

TABLE V

*9/7 latex with resorcinol-formaldehyde adhesion of cord to natural and synthetic rubber*

| RHC, Percent | Rubber | Adhesion | | |
|---|---|---|---|---|
| | | Cotton | Rayon | Nylon |
| 9/7 | Natural | [1] 23.4 | [1] 19.4 | 21.2 |
| 9/7 | GR-S | [1] 23.8 | [1] 18.4 | 23.2 |

[1] Cord broke. RHC symbolizes rubber hydrocarbon; 9/7 symbolizes 9% butadiene-vinyl pyridine rubbery copolymer and 7% butadiene-styrene rubbery copolymer plus 2% of a resorcinol-formaldehyde resin.

Table VI shows the effect of adhesive dilution on adhesions.

TABLE VI

*Effect of adhesive dilution on adhesions*

| Adhesive | Percent Solids | Adhesions | | | | | |
|---|---|---|---|---|---|---|---|
| | | Natural Rubber | | | GR-S | | |
| | | C | R | N | C | R | N |
| 9/7-2 | 18 | 25.6 | 20.0 | 28.6 | 24.0 | 19.6 | 24.4 |
| 9/7-2 | 13.5 | 24.0 | 19.0 | 24.0 | 23.2 | 19.6 | 22.8 |
| 9/7-2 | 9 | 25.0 | 19.8 | 19.8 | 24.4 | 19.8 | 18.0 |
| 9/7-2 | 4.5 | 22.0 | 16.2 | 14.6 | 23.8 | 19.2 | 13.6 |

[1] 9% B/VP-7% GR-S-2% resorcinol-CH$_2$O. C symbolizes cotton, R symbolizes rayon and N symbolizes nylon.

In Table VII is shown the effect of ageing at 250° F. for an adhesive containing 9% B/VP latex, 7% GR-S latex plus 2% of casein in one set of tests, plus 2% phenol-formaldehyde in the second set, and plus 2% resorcinol in the third set.

TABLE VII

*Oven age tests—9/7 latex with casein, phenol-formaldehyde and resorcinol-formaldehyde resins*

| Resin | Hrs. @ 250° F. | Adhesions | | | | | |
|---|---|---|---|---|---|---|---|
| | | Natural Rubber | | | GR-S | | |
| | | Cotton | Rayon | Nylon | Cotton | Rayon | Nylon |
| 2% Casein | 0 | 19.6 | 20.0 | 23.8 | 22.6 | 18.0 | 20.8 |
| Do | 2 | 24.8 | 19.0 | 22.4 | 27.2 | 18.6 | 26.6 |
| Do | 4 | 26.0 | 19.2 | 24.4 | 25.6 | 18.8 | 26.2 |
| 2% Phenol-CH$_2$O | 0 | 21.6 | 19.6 | 27.2 | 22.8 | 18.2 | 24.0 |
| Do | 2 | 22.4 | 16.2 | 19.0 | 24.0 | 17.0 | 25.4 |
| Do | 4 | 23.0 | 18.6 | 21.2 | 22.0 | 18.0 | 24.6 |
| 2% Resorcinol-CH$_2$O | 0 | 23.4 | 19.8 | 24.8 | 24.2 | 18.8 | 25.8 |
| Do | 2 | 19.8 | 17.8 | 16.8 | 26.4 | 19.0 | 18.0 |
| Do | 4 | 18.4 | 16.8 | 16.2 | 25.8 | 19.4 | 19.6 |

From the above table it may be observed that the casein resins take a relatively long baking time to develop best adhesion and that the aldehyde resins produce good adhesions in the beginning and tend to fall off with time. These aldehyde resin type adhesives are ideal for train dip and calender operations or pickless calendering in view of the time interval between the dip and the calendering.

Table VIII shows the results obtained when reacting the formaldehyde and phenol before addition to the latices and when adding the monomers in the unreacted state to the latices.

TABLE VIII

| Formula,[1] percent resin | Condition | Percent pick up | Adhesion | | | |
|---|---|---|---|---|---|---|
| | | | GR-S | Natural | Natural, ½ hr. | Natural, 4 hr. |
| 1 | monomers | 17.4 | 14.4 | 17.6 | 17.4 | 18.2 |
| 2 | do | 17.1 | 12.4 | 15.8 | 17.2 | 20.0 |
| 3 | do | 18.7 | 10.6 | 12.2 | 13.4 | 15.0 |
| 1 | resin | 15.5 | 22.4 | 23.6 | 23.6 | 27.0 |
| 2 | do | 17.6 | 23.6 | 27.4 | 22.2 | 21.4 |
| 3 | do | 19.8 | 25.0 | 26.8 | 28.0 | 24.8 |

[1] 13% B/VP–10% GR–S plus resin as shown. Percent pick up means the amount of adhesive by weight picked up by the cord as it is run through the dip tank containing the adhesive.

In view of these results it is preferred to react the formaldehyde with the phenol before addition to the latices.

Table IX shows the effect of varying the amount of resorcinol-formaldehyde resin used with 13% B/VP latex and 10% GR–S latex.

TABLE IX

*13% B/VP/10% GR–S with resorcinol-formaldehyde resin*

| Percent resin | Percent pick up | GR-S | Natural | Natural, ½ hr. | Natural, 4 hr. |
|---|---|---|---|---|---|
| 1 | 19.8 | 23.8 | 22.8 | 25.6 | 19.6 |
| 2 | 20.1 | 24.2 | 24.2 | 26.2 | 20.2 |
| 3 | 20.9 | 26.6 | 24.4 | 23.8 | 20.0 |
| 4 | 20.9 | 23.8 | 24.6 | 25.6 | 21.2 |
| 5 | 22.3 | 27.2 | 25.0 | 24.2 | 21.2 |
| 6 | 21.4 | 24.2 | 24.0 | 26.4 | 18.6 |
| 7 | 22.3 | 24.0 | 25.8 | 26.2 | 17.8 |

Percent pick up means the amount of adhesive by weight picked up by the cord as it is run through the dip tank containing the adhesive.

Suitable changes may be made in the details of the process without departing from the spirit or scope of the present invention, the proper limits of which are defined in the appended claims.

We claim:

1. A bonded composite material comprising a cord embedded in a vulcanized rubber, and a composition comprising a copolymer of a 1,3-diene monomer and a vinylpyridine monomer, a rubbery copolymer of styrene and 1,3-butadiene and a phenol-formaldehyde resin forming a bond between the cord and rubber.

2. A bonded composite material comprising a cord embedded in a vulcanized rubber, and a composition comprising a copolymer of isoprene and a vinylpyridine monomer, a rubbery copolymer of styrene and 1,3-butadiene and a phenol-formaldehyde resin forming a bond between the cord and rubber.

3. A bonded composite material comprising a cord embedded in a vulcanized rubber, and a composition containing 10–26% solids of a copolymer resulting from the polymerization of a mixture containing 1,3-butadiene and 2-vinylpyridine present in a butadiene-vinylpyridine ratio of 95/5 to 20/80, a rubbery copolymer of styrene and 1,3-butadiene and a phenol-formaldehyde resin the composition forming a bond between the cord and rubber.

4. A bonded composite material comprising a cord embedded in a vulcanized rubber, and a composition comprising a copolymer of a vinylpyridine and a 1,3-diene monomer, a rubbery copolymer of styrene and a 1,3-diene monomer and a stage "A" phenol-formaldehyde resin, the composition forming a bond between the cord and rubber.

5. A bonded composite material comprising a cord embedded in a vulcanized rubber, and a composition comprising a copolymer of a vinylpyridine and a 1,3-diene monomer, a rubbery copolymer of styrene and a 1,3-diene monomer and a resorcinol-formaldehyde resin, the composition forming a bond between the cord and rubber.

6. A bonded composite material comprising a cord embedded in a vulcanized rubber and a composition comprising 5 to 15% of a copolymer of 1,3-butadiene and a vinylpyridine, 5 to 10% of a rubbery copolymer of styrene and a 1,3-diene monomer, and 1 to 5% of a resin selected from the group consisting of a stage "A" phenol-formaldehyde resin and a resorcinol-formaldehyde resin, the composition forming a bond between the cord and rubber.

GERALD D. MALLORY.
THEODORE R. TEN BROECK.

REFERENCES CITED

The following references are of record in the file of this patent:

UNITED STATES PATENTS

| Number | Name | Date |
|---|---|---|
| 2,256,153 | Riehl | Sept. 16, 1941 |
| 2,291,208 | Brown et al. | July 28, 1942 |
| 2,294,826 | Pieper et al. | Sept. 1, 1942 |
| 2,314,976 | Gazdik et al. | Mar. 30, 1943 |
| 2,314,997 | Lessig et al. | Mar. 30, 1943 |
| 2,314,998 | Lessig et al. | Mar. 30, 1943 |
| 2,354,426 | Briant | July 25, 1944 |
| 2,360,946 | Hershberger | Oct. 24, 1944 |
| 2,397,050 | Sarbach | Mar. 19, 1946 |
| 2,402,020 | Cislak et al. | June 11, 1946 |
| 2,561,215 | Mighton | July 17, 1951 |

FOREIGN PATENTS

| Number | Country | Date |
|---|---|---|
| 849,126 | France | Aug. 7, 1939 |